May 29, 1945.     G. G. HOWARD     2,377,010
HOSE COUPLING
Filed Feb. 4, 1943
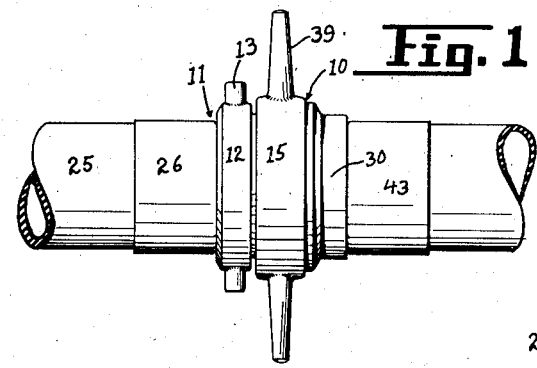
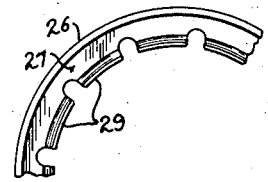
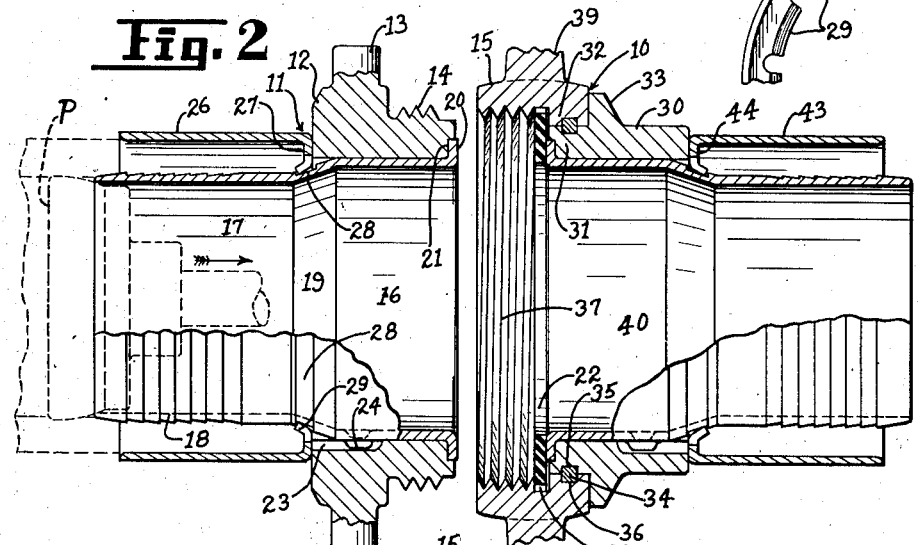
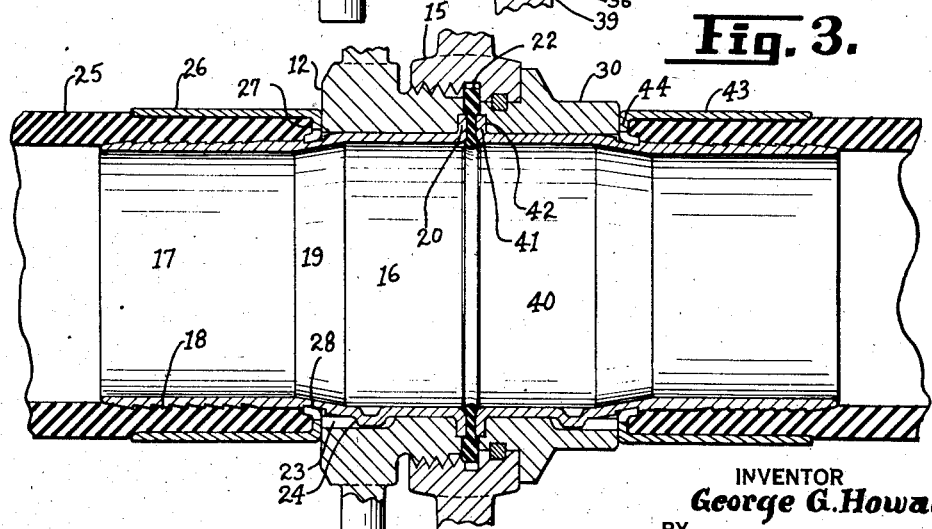
INVENTOR
*George G. Howard*
BY
*H. F. Johnston*
ATTORNEY Patented May 29, 1945

2,377,010

UNITED STATES PATENT OFFICE 2,377,010

HOSE COUPLING

George G. Howard, Waterbury, Conn., assignor to Scovill Manufacturing Company, Waterbury, Conn., a corporation of Connecticut Application February 4, 1943, Serial No. 474,648

13 Claims. (Cl. 285—84)

This invention relates to hose couplings and particularly to that type of coupling which is adapted to be permanently secured to the end of a tubular rubber hose.

One of the principal objects of this invention is to construct a coupling in which the heavier part of the coupling is made of a casting or of a forging material and other parts are made of relatively thin ductile sheet metal drawn into a shell or cut from a piece of tubing and so designed as to minimize the machining operations and the cost of producing tools for making the same. The principle of this construction lends itself admirably to the manufacture of relatively large size couplings and assures the maximum of strength with no danger of fractures or hidden weaknesses in the parts subjected to the greatest deformation or strains.

Heretofore it has been the practice to make the major portion or the entire coupling from cast material, forged or machined from rod stock, and it is well known in this art that wherein a casting, forging or rod stock is employed which has to be subjected to a machining operation in both ferrous and non-ferrous alloys must necessarily contain specified amounts of certain elements or ingredients and be subjected to various treatments. While alloys are selected with a view of rendering the machinability of the cast, forged or rod stock more advantageous, it is well known that articles so processed tend to lessen the ductibility and percentage elongation of the material to such an extent that coupling bodies subjected to the usual amount of deformation in making an assembly to a hose would fracture or season crack. Also it is extremely difficult to construct a cast or forged body that will be entirely free of imperfections such as air holes, porosity and the like that might result in weaknesses in the coupling wherein critical bending operations must take place in the assembly of the coupling.

Another object of this invention is to provide male and female coupling units capable of being detachably united together by a nut swivelling on the female unit, and in which the main body parts of the units are in the form of a cast or forged ring to which is attached a tubular interior sleeve and an outside ferrule both of which are made of sheet metal ductile materials and of like construction for both units and so arranged as to be interlocked permanently to their respective body ring coincident with the assembly of the units to a hose end, which construction results in a considerable savings in the standardization of parts of two different types of coupling units. In addition further savings may be effected in that the design of the coupling is such that parts of the coupling may be easily salvaged and reused whenever a new connection is made to the hose or the hose member has to be replaced.

Another object of this invention is to provide a means for interlocking the outside ferrule with the interior nipple sleeve coincident with the hose assembly, wherein the inter-connecting part of the ferrule is capable of taking a bending action to prevent the surrounding or adjacent portion of the ferrule member from bulging or being distorted during the expanding operation of the interior nipple. This particular feature is an improvement upon the Hoffman Patent No. 2,216,839 dated October 8, 1940.

Another advantage of this coupling is that the outside sleeve or ferrule is made independently of the body and the inside nipple sleeve, and thus various sizes of ferrules may be employed to compensate for the variations in size and thickness that is commonly found in the commercial types of standard hose, and further that the interlocking feature of the ferrule is designed to assume an interlocking connection with the nipple regardless of the size of the ferrule that is selected or the amount of expansion that is given to the nipple coincident with the assembly operation.

Another object of this invention resides in the feature of designing the coupling so that no fluid passing through the coupling can contact with the casting or forging and in the provision of a sealing means between the male and female couplings when united together which will be effective wherein the coupling may be used in connection with a hose subjected to a high pressure in both suction and discharge forces.

With the foregoing and other objects in view which will appear as the disclosure proceeds the invention resides in a combination and arrangement of parts and in the details of construction herein described and claimed, it being understood that changes may be made in the precise embodiment of the invention herein described without departing from the spirit of the same.

In the drawing Fig. 1 is a side elevational view of the united male and female coupling units.

Fig. 2 is an enlarged vertical axial section through the same showing the male and female bodies in a separated state and as the coupling appears before the attachment to the ends of the hose material.

Fig. 3 is a similar view but showing the coupling units as they appear when connected together and with the units permanently attached to their respective hose end.

Fig. 4 is a fragmentary end view of the outside ferrule showing the details of the means for interlocking with the nipple sleeve.

Referring now to the drawing in which like numerals designate like parts throughout the several views, the numeral 10 refers to the complete female coupling as a unit and the numeral 11 designates the male part of the coupling as a unit. The male part 11 consists of a cast ring 12 having a pair of diametrically opposed pin projections 13 to which a pin wrench may be engaged in the usual manner when making the assembly between the male and female coupling units. The cast ring 12 has a reduced threaded portion 14 for cooperation with a swivelling nut 15 forming part of the female coupling unit 10 as will be more fully explained later. Fitted into the interior diameter of the cast ring 12 is a tubular sleeve 16 made preferably from a sheet metal drawn shell or could be made from a piece of tubing which will render it considerably more ductile than if it were an integral part of a cast ring. The tubular sleeve in its initial state is provided with a reduced nipple portion 17 projecting beyond one face of the ring 12 and having circumferential serrations or teeth 18 that are adapted to bite into the hose material coincident with the expanding assembly operation. The reduced nipple portion 17 is connected to the tubular sleeve by a reducing conical section 19 and the point of connection of the conical section with the larger tubular sleeve proper is somewhat removed rearwardly of the outer face of the cast ring 13 so as to merit all the accrued advantages mentioned in the above referred to Hoffman patent for this particular feature. The tubular sleeve 16 may be secured to the cast ring 12 as by means of a drive fit the outer end of which is provided with a radial flange 20 which is adapted to seat in a countersunk recess 21 provided in the adjacent face of said cast ring, the flange 20 serving as a stop for the axial assembly of the sleeve 16. It is to be noted at this point that the depth of the countersunk recess is somewhat less than the thickness of the radial flange 20 so that when the tubular sleeve 16 is assembled the exposed face of the flange will project slightly beyond the surrounding adjacent face of the ring and specifically in this case about a third of the metal thickness. This is for the purpose of making a leak-proof seal in cooperation with a sealing washer 22 carried by the female coupling as will be explained later and as pointed out as one of the objects of this invention. If perchance the drive fit between the sleeve 16 and ring 12 is not sufficient to assure a firm enough anchorage to prevent relative rotation, suitable interlocking means may be provided in forming one or several spaced recesses 23 in the interior of the cast ring 12 and form a corresponding number of outwardly nib projections 24 from the tubular sleeve to engage thereinto.

In making a permanent attachment of the male coupling with the end of a hose such as is indicated by the numeral 25 and to hold the hose within confined quarters during the expansion of the tubular nipple 17 a surrounding sleeve or ferrule 26 is employed having a flanged end 27. The sleeve or ferrule 26 is assembled by first slipping it over the end of the hose until stopped by the flange 27 and then the hose with the surrounding ferrule 26 is axially forced over the nipple portion 17 until the outer face of the flange 27 is adapted to abut against the adjacent surface of the cast ring 12.

For all practical purposes for holding this outside ferrule in position, I have found that a ferrule with a plain annular inward flange 27 seated against the face of the cast ring is sufficient in connection with large couplings to which this principle has been put into common practice, showing that the outside ferrule has been retained rigidly enough in position depending entirely upon the expansive forces of the hose outwardly against the inner wall of the ferrule and axially against the flange when the coupling unit is assembled to a hose end.

If, however, it becomes expedient in smaller types of couplings or even larger ones subjected to higher pressures I have disclosed an interlocking means between the nipple and the sleeve that is somewhat comparable to the Hoffman patent mentioned above, but has structural details that are different to avoid certain faults that have become apparent in Hoffman's particular construction. To this end in the reducing conical section 19 of the nipple is provided an annular groove 28, and the inner circumference of the ferrule flange 27 is provided with a series of relatively wide lugs or interrupted collar portions 29 in which the lugs somewhere within their intermediate portion are flared or biased outwardly from the plane of the flange 27 and in their initial state at an angle somewhat greater than the angle of the conical portion 19 and the seat of the annular groove 28 within which the lugs or collar portions are adapted to engage. The design of the lugs 29 may be such that in the initial assembly of the ferrule 26 fitted over the end of a hose and then telescoped upon the nipple portion 17 that the lugs 29 will be caused to snap over the adjacent edge wall of the groove 28 to loosely retain the ferrule in position preliminary to the final nipple expansion operation.

The final assembly of the male coupling unit 11 is effected by means of a suitable punch member P shown in dotted outline and lined up with the male unit 11 of Fig. 2 and starting preferably from the inner end of the nipple 17 and being drawn outwardly therethrough so that the direction of expansion forces exerted upon the hose will tend to cause the hose material to be forced or flowed inwardly toward the flanged end 27 of the ferrule 26. This distortion or enlargement of the reducing conical portion 17 will, of course, obviously change its angular position in a manner as shown in Fig. 9 and this bending or hinging action, as it might be called, of the reducing portion will in turn cause the tongues 29 of the ferrule flange 27 to bend outwardly in conformity thereto. This bending of the lugs 29 precludes any severe radial forces being transmitted to the ferrule flange 27 proper such that the outer surrounding end of the ferrule would be bulged outwardly or otherwise distorted and thus increase the pocket area into which the hose end is to be clamped and also destroy the neat cylindrical appearance of the coupling ferrule.

Another important feature of this coupling is the fact that when the nipple is expanded from the inside outwardly, as pointed out above, results in forcing the hose material inwardly to exert a high compressive force against the flange 27 of the outside ferrule 26 backed up by the adjacent face of the ring 12. Further the fact that the natural tendency of the compressed hose to axially expand out of it confining annulus against the gripping effect of the nipple serrations 18 will tend to urge the nipple 17 and integral sleeve 16 axially and to the left as viewed in Fig. 2 and thus result in two counteracting forces on the opposite faces of the coupling ring 12—one exerted by the ferrule flange 27 and the other by the interior sleeve flange 20 and act in the manner of a vise to hold the parts of the coupling together as a rigid unit.

In considering now the constructional aspects of the female coupling unit 10 which consists essentially of a body member or ring 30 having a neck 31 which is adapted to be rotatably fitted into a bearing portion 32 of the swivel ring 15 previously mentioned. The swivel nut 15 is adapted to be abutted against the transverse face of an abutment flange 33 integral with an intermediate portion of the body member 30, and the ring 15 is adapted to be held in permanent locking rotatable engagement with the neck 31 as by means of an interlocking wire 34 fitted into corresponding recesses 35 and 36 formed in the adjacent cylindrical surfaces of the body and nut members. For more specific details of the interlocking wire 34 and the means of assembly the same reference may be had to my co-pending application filed November 4, 1942, Serial No. 465,820.

The swivel nut 15 is provided with an internal thread 37 and between the thread and the bearing portion 32 is a circumferential recess 39 adapted to receive the sealing washer 22, it being understood that the outside diameter of the washer is somewhat greater than the minor diameter of the thread so as to be held in back of the rearmost thread of the swivel nut 15 when the male and female couplings are separated from each other. In order to manipulate the swivel nut 15 provision is made of a pair of diametrically opposed relatively long hand members 39 that may be manually grasped onto for holding or turning the ring while the male unit 11 is being threaded to the threaded portion thereof, as by means of a wrench or suitable tool for engaging the projecting pins 13 of the cast ring 12.

The female coupling unit 10 is completed by the assembly of an internal tubular sleeve nipple 40 having a flange 41 fitted into a countersunk recess 42 of the body member 30 identical to the construction of the male unit 11, and a surrounding sleeve or ferrule 43 having a flange 44 abutted against the adjacent face of the body member 30. These two members are adapted to be attached to the female body in a manner identical to the tubular sleeve 16 and ferrule 26 as explained in connection with the male unit 11, and further explanation is considered unnecessary, except to point out that inasmuch as these inner sleeves and outside ferrules of the male and female units are identical they can be made from the same set of tools and fabricated in the same manner and also assembled to the hose in an identical fashion.

One of the advantages of this coupling as pointed out in the objects is the particular means for effecting a leak-proof seal when connecting the male and female coupling units together. This is shown in Fig. 3 and results particularly from the manner in which the flanged ends of the tubular sleeves 16 and 40 have their outermost surfaces raised slightly beyond the adjacent faces of their respective bodies. This is to assure a firm compressive action against the interposed washer 22, and further the fact that these flanges are raised but a slight distance above the adjacent faces of the cast rings assures that there will be no sever cutting action upon the washer, and the remaining portion of the washer that is not clamped between these flanges will be backed up by the adjacent faces of the male and female rings 12 and 30. One of the reasons why I have resorted to this particular construction is because in providing a countersunk groove in the male and female body to receive the nipple flanges, it is relatively difficult to control the exact depth of the counterseat or the thickness of the nipple flanges so that, if the coupling was constructed to have the outer faces of the flanges flush with their respective bodies, it might result occasionally, in dealing with normal manufacturing tolerances, that the face of the flange might become seated below the body face, whereupon the greater pressure would be exerted upon the washer by the body faces rather than the flange portion, and thereupon allow for leakage between the flange portions, which leakage could creep in back of the flanges since the nipple attachment to the body is merely by drive fit. By having the face of the flanges elevated as described above and illustrated in the drawing I can also assure the proper engagement of the flanges against the washer so that the leak-proof seal will be effective at that point and preclude any leakage of the coupling either under suction or a discharge condition.

In effecting one of the economies of this coupling construction is in being able to salvage parts of the same when making a new connection to a hose end, and to this end I will describe how such savings will result in the male coupling unit 11. In removing the coupling from a hose end it will only be necessary to destroy the outside ferrule 26 in order to detach the remaining portion of the coupling from the hose. Specifically the ferrule may be split longitudinally with a cold chisel or cut in a spiral manner with a hack saw. The sleeve 16 with its integral nipple 17 may be driven out and reformed to its original state such as shown in Fig. 2 and reinserted into its respective cast ring 12, whereupon a new outside ferrule is only required to make a new assembly of the same coupling to a hose end. Obviously the same salvaging of parts will apply to the female unit 10.

One form of the invention is presented herein for the purpose of exemplification, but it will, of course, be appreciated that the invention is susceptible of embodiment in other structurally modified forms coming equally within the scope of the appended claims.

I claim:

1. In a hose coupling adapted to be attached to the end of a flexible hose, comprising a body ring made of heavy rigid material, a tubular member of relatively thin ductile material telescopically fitted and anchored within said body ring and having a nipple portion projecting beyond said ring for insertion into the end of a hose, and an outside cylindrical sleeve member also of thin ductile material surrounding said hose and having a flanged end abutted against the adjacent face of said ring, one of said members being distorted toward the other member for compressing the hose material therebetween and permanently anchoring the coupling as a unit to the hose.

2. In a hose coupling adapted to be attached to the end of a flexible hose, comprising a body ring made of heavy rigid material suitable for taking a machining operation, a tubular member of relatively thin ductile material rigidly secured within said body ring, said member having a flanged end seated against one end of said ring as a stop and an integral nipple portion extending from the opposite end of said ring, and a ferrule member also of thin ductile material fitted about the hose end and having a flanged end abutted against the opposite end of said ring, one of said members being progressively distorted from its outer end inwardly to crowd the hose material against the ferrule flange and in combination with the tubular member flange acting as a vise to embrace the opposite ends of the body ring as an added means for securing the coupling parts together as an integral coupling unit.

3. In a hose coupling adapted to be attached to the end of a flexible hose, comprising a body ring made of relatively heavy material suitable for taking a machining operation, a tubular member of relatively thin ductile material rigidly secured within said body ring and having an integral nipple reduced portion extending from one end of said ring with an interconnecting reducing portion therebetween, and a ferrule member also of thin ductile material surrounding said nipple and having a flanged end abutted against the adjacent face of said ring and defining with said nipple an annulus for the reception of the hose end, said nipple portion expanded outwardly for confining said hose material within said annulus for permanent assembly of the coupling to the hose, and means for interlocking the flange of said outside ferrule to said nipple coincident with the nipple expansion, and which means is capable of partaking of a bending action to preclude transmitting expansive forces to said ferrule such as would distort the same.

4. In a coupling adapted to be attached to the end of a flexible hose, comprising a body ring made of relatively heavy material suitable for taking a machining operation, a tubular member of relatively thin ductile material rigidly secured within said ring and having a reduced nipple portion projecting beyond one face of said ring with an integral interconnecting conical portion therebetween, said conical portion provided with a circumferential recess therein, and a ferrule member also of thin ductile material surrounding said nipple and having a flange end abutted against the adjacent face of said ring and defining with said nipple an annulus for the reception of the hose end, said nipple portion expanded outwardly for confining said hose material within said annulus for permanently connecting the coupling to the hose, the inner edge of said ferrule flange provided with interlocking means for engagement into said recess and capable of partaking of a radial bending action coincident with the nipple expansion without distorting the flange proper of said ferrule.

5. In a coupling adapted to be attached to the end of a flexible hose, comprising a body ring made of relatively heavy material suitable for taking a machining operation, a tubular member of relatively thin ductile material having a telescopic drive fit into said ring and having a reduced nipple portion projecting beyond one face of said ring with an integral interconnecting conical portion therebetween, said conical portion provided with a circumferential recess therein, and a ferrule member also of thin ductile material surrounding said nipple and having a flange end abutted against the adjacent face of said ring and defining with said nipple an annulus for the reception of the hose end, said nipple portion expanded outwardly for confining said hose material within said annulus for permanently connecting the coupling to the hose, the inner edge of said ferrule flange provided with an interrupted collar portion that is disposed in the plane of the recess when the ferrule is in assembled position and upon expansion of said nipple portion said conical portion is adapted to be distorted to cause said ferrule collar portion to seat in said recess as a means for interlocking the ferrule to the nipple sleeve against axial displacement, said interrupted collar portion being angularly disposed or biased out of the plane of the ferrule flange to partake of a bending action coincident with the expansion of said nipple and conical section.

6. In a hose coupling adapted to be attached to the end of a flexible hose, comprising a relatively heavy body ring made by casting or forging and of a material suitable for taking a machining operation, a tubular member having a flanged end engaged against one face of the ring and a nipple portion having an outer serrated surface and extending from the opposite face of said ring, a ferrule also having a flanged end and adapted to embrace the end of the hose and to be fitted with the hose over said nipple with its flanged end abutted against the opposite face of said ring, both the tubular member and the ferrule being made of relatively thin ductile material capable of being distorted without impairing its structural strength, said nipple being progressively axially expanded from its free end toward its ring attached end to cause the compressive forces of the rubber to be directed against the ferrule flange, and the inherent nature of the rubber to expand exerting an axial force against the serrated nipple and thus set up counterposed clamping forces by the ferrule and tubular member flanges in the manner of a vise against opposite faces of said ring.

7. In a hose coupling as defined by claim 6 wherein interlocking means are provided between the ring and tubular member to preclude relative rotation.

8. In a swivel-joint hose coupling comprising male and female coupling units in which both units comprise a relatively heavy body ring, and said female unit ring having a threaded nut swivelly associated therewith for threaded engagement with said male ring, both rings having like tubular member of relatively thin ductile material secured thereto with a nipple portion projecting outwardly therefrom, and like ferrule members also of thin wall ductile material surrounding said projecting nipple portions and defining therewith an annulus for the reception of a hose end, one of said members being uniformly distorted toward the other member for binding the hose within the annulus for effecting a permanent assembly of the hose to the coupling members, and sealing means disposed between said coupling rings for sealing the two cooperating coupling units when detachably assembled together.

9. In a union hose coupling comprising male and female coupling units in which both units comprise a relatively heavy body ring, and said female unit having a means for detachable connection with the male unit, a pair of like tubular sleeves made of thin metal ductile material fitted into said rings and having integral nipple portions projecting beyond one face of said rings, and a pair of ferrule members also of thin metal ductile material and of like design surrounding said nipple portions and defining an annulus in which the hose material may be compressed for effecting a permanent assembly with the male and female units, and a washer disposed between adjacent faces of said rings and adapted to be compressed when the male and female units are united together as a sealing means between the two units.

10. In a union hose coupling comprising male and female coupling units in which both units comprise a relatively heavy body ring and said female unit having a means for detachable connection with the male unit, a pair of like tubular sleeves made of thin metal ductile material fitted into said rings and each having a flanged end overlying the adjacent faces of each of said rings and each having an integral nipple portion projecting from the opposite faces of said rings, and a pair of ferrule members also of thin metal ductile material and of like design having a flanged end abutted against the opposite faces of said rings and surrounding said nipple portions and defining therewith an annulus in which the hose material may be compressed for effecting a permanent assembly with male and female units, and a washer disposed between the adjacent faces of said rings and overlying flanges of said sleeves and adapted to be compressed therebetween when the male and female units are united together as a sealing means between the two units.

11. In a union hose coupling as defined by claim 10 wherein the adjacent faces of said cast rings are countersunk for the reception of the sleeve overlying flanges and of a depth slightly less than the thickness of said flanges whereby the greater compressive forces upon said washer will be exerted by said flanges.

12. In a swivel-joint hose coupling comprising male and female coupling units in which both units each comprises a relatively heavy cast body ring, a swivel nut carried by said female unit and having detachable threaded engagement with said male unit, each of said rings having a tubular interior flanged sleeve and a flanged outside ferrule made of thin metal ductile material and of common design associated therewith, the flanges of said sleeves and ferrules embracing opposite faces of said rings, and a washer normally carried in said swivel nut and compressed between said tubular sleeve flanges as an effective seal when the coupling units are united together.

13. In a swivel-joint hose coupling as defined by claim 12 wherein the adjacent faces of said cast rings are countersunk for the reception of the sleeve flanges and of a depth slightly less than the thickness of said flanges whereby the greater compressive forces upon said washer will be exerted by said flanges.

GEORGE G. HOWARD.